United States Patent [19]

Buggele

[11] 4,170,522
[45] Oct. 9, 1979

[54] FLUID REFINING METHOD

[76] Inventor: Alvin E. Buggele, #7 Milan Manor Dr., Milan, Ohio 44846

[21] Appl. No.: 620,245

[22] Filed: Oct. 6, 1975

Related U.S. Application Data

[62] Division of Ser. No. 522,708, Nov. 11, 1974, abandoned.

[51] Int. Cl.$^2$ .............................................. B01D 3/14
[52] U.S. Cl. ...................................... 203/87; 203/39; 202/153; 202/205; 417/154
[58] Field of Search ............... 203/4, 39, 87; 202/153, 202/158, 181, 205, 257, 261; 417/152–154

[56] References Cited

U.S. PATENT DOCUMENTS

| | | | |
|---|---|---|---|
| 1,730,891 | 10/1929 | Leslie | 202/158 |
| 2,383,945 | 9/1945 | Shantz | 203/87 |
| 2,727,855 | 12/1955 | Goldbarry | 202/181 |
| 3,496,159 | 2/1970 | Spence | 203/87 |

FOREIGN PATENT DOCUMENTS 768995  2/1957  United Kingdom ...................... 417/152

Primary Examiner—Norman Yudkoff

Attorney, Agent, or Firm—David D. Murray; Vincent L. Barker, Jr.

[57] ABSTRACT

A diffusion pump capable of separating impurities from its pump fluid during operation is disclosed. Skimming drains are provided in the pump's boiler for periodically skimming the evaporative surface of the working fluid. This eliminates nearly all contaminants of higher molecular weight than the pump fluid. In the foreline of the pump, a series of peripheral gutters are provided for trapping, separating and draining off condensates. The gutters facilitate the removal of impurities of lower molecular weight than that of the pump fluid. Means are also provided for further removing trace quantities of residual volatile impurities which tend to backstream up the diffusion pump barrel. The highly purified pump fluid allows for a more vigorously working evaporative surface, thereby increasing the throughput of the diffusion pump. Together with the elimination of volatile impurities from the pump barrel, this facilitates the attainment of significantly higher ultimate chamber vacuum. The withdrawn condensates and skimmed residues also form the basis for use of the apparatus as a device for obtaining a high degree of separation between liquids of very close vapor pressures.

5 Claims, 7 Drawing Figures

U.S. Patent  Oct. 9, 1979  Sheet 1 of 3  4,170,522
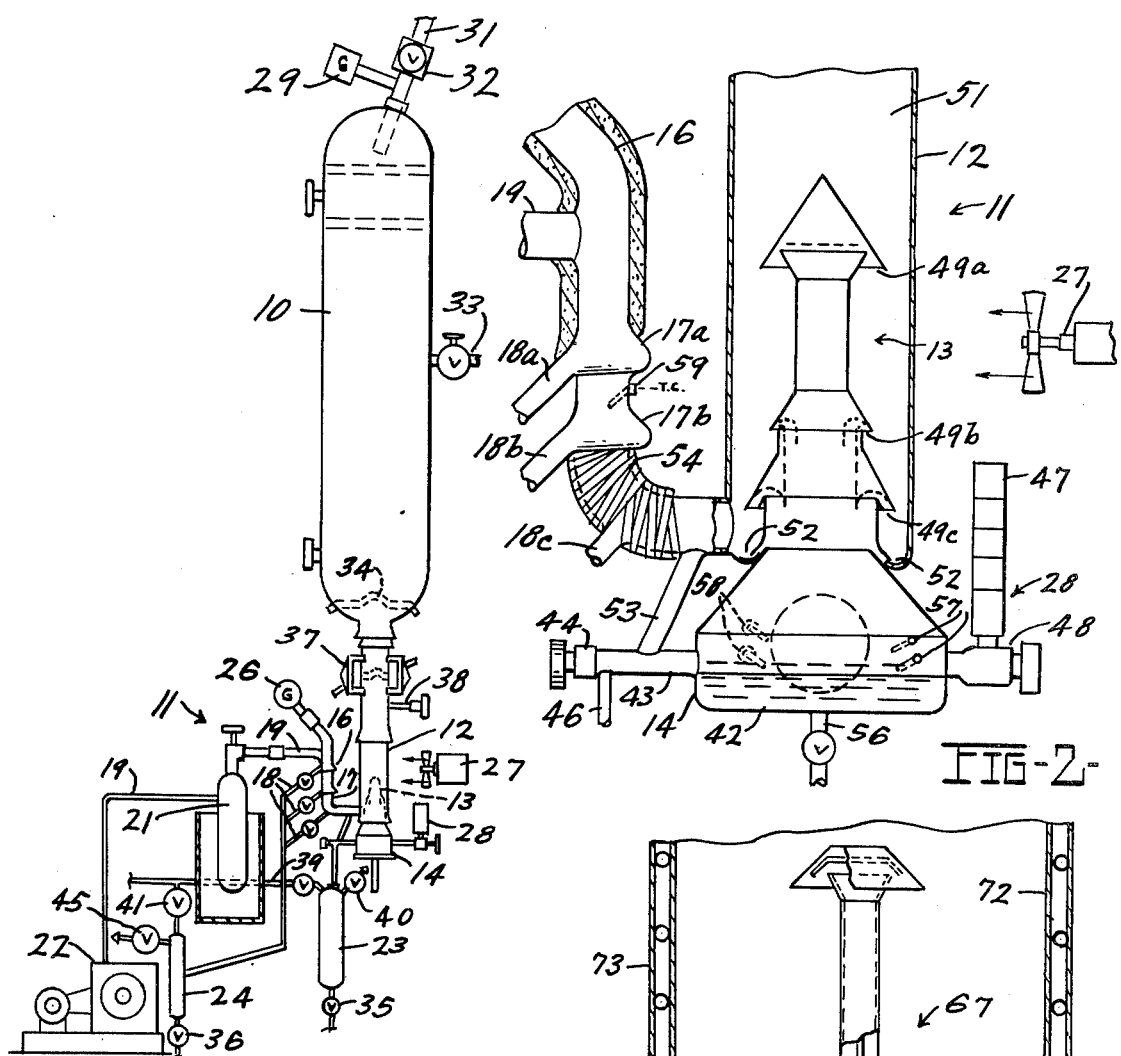
FIG-1-
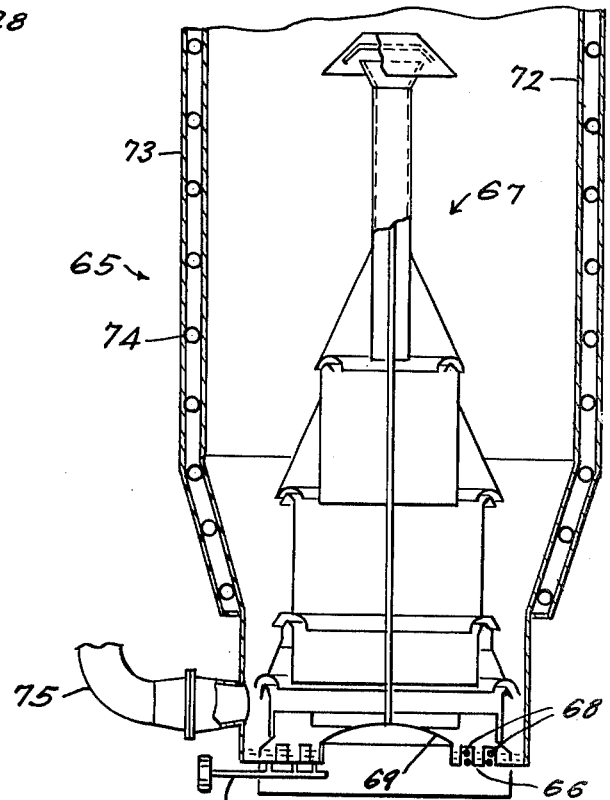
FIG-2-
FIG-3-
PRIOR ART

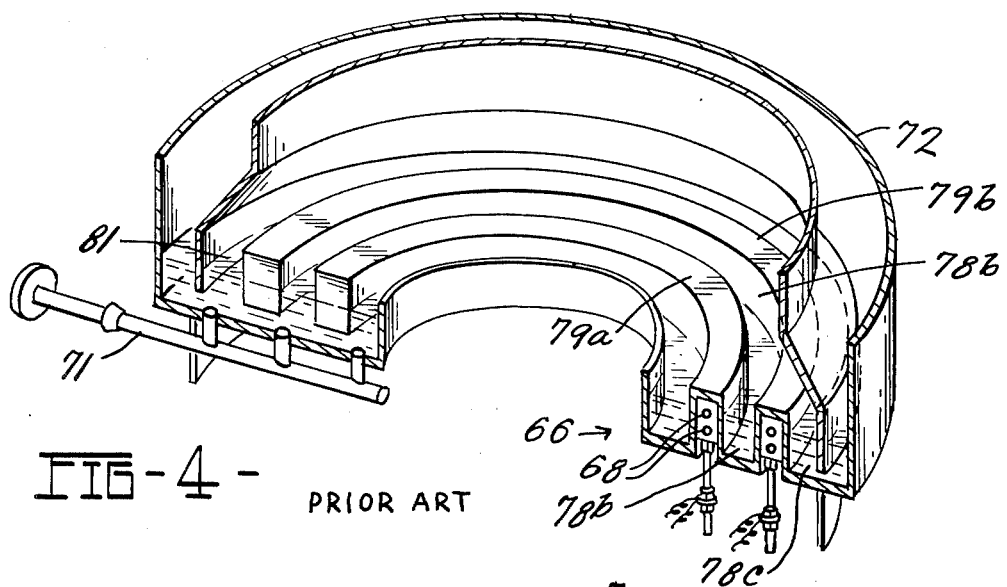
FIG-4- PRIOR ART
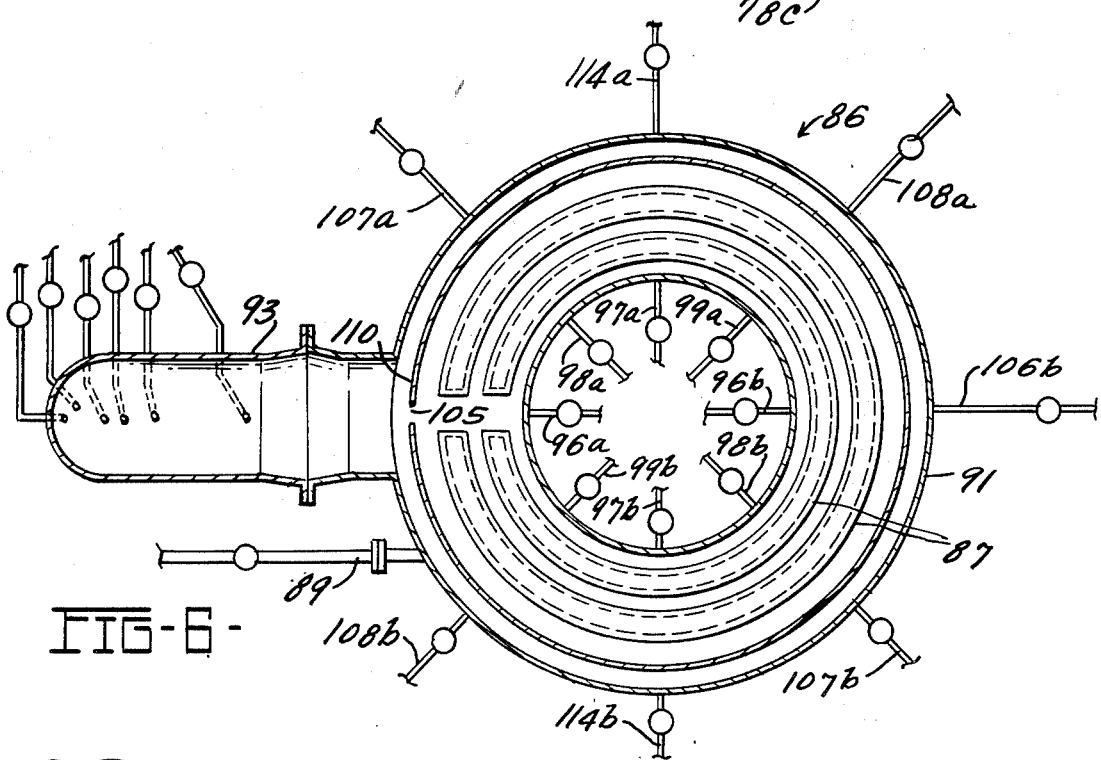
FIG-6-
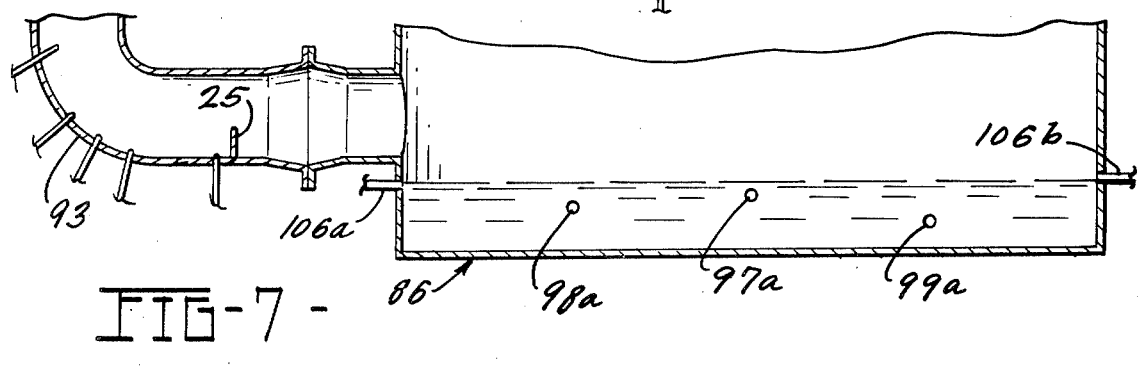
FIG-7-

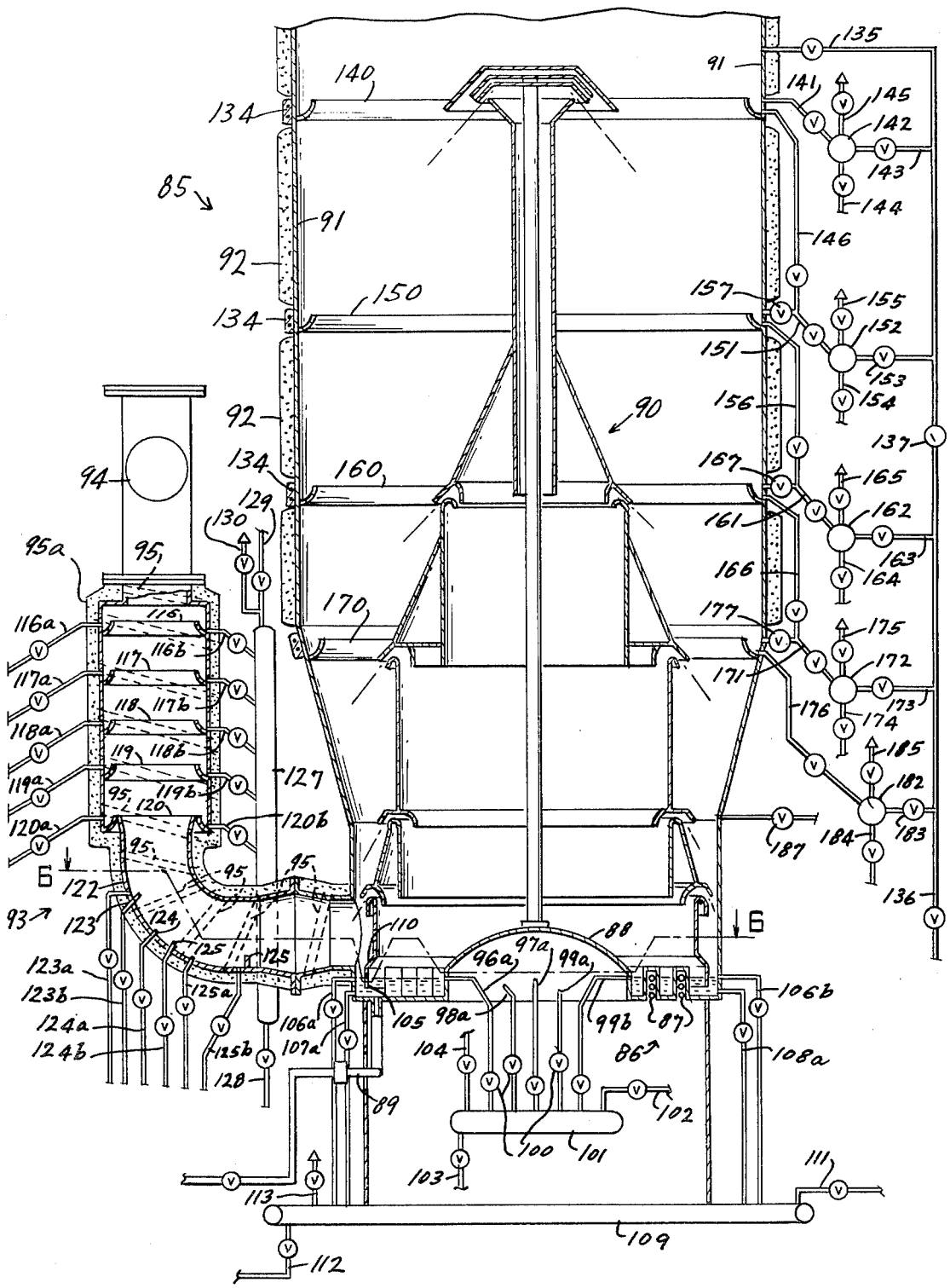
FIG-5-

FLUID REFINING METHOD

This is a division of application Ser. No. 522,708 filed Nov. 11, 1974 now abandoned.

BACKGROUND OF THE INVENTION

The invention relates to diffusion pumps for producing high vacuum and more particularly to an improved diffusion pump by which the pump fluid may be separated from its impurities during operation.

Diffusion type pumps for producing high vacuum are well known. The original effort of Gaede around 1914 was supplemented by Langmuir in the development of the vertical jet diffusion pump disclosed in U.S. Pat. No. 1,393,350, and the single inverted jet or mushroom pump covered by U.S. Pat. No. 1,320,874. A multiple jet modification of the mushroom pump is described in U.S. Pat. No. 1,367,865. Such pumps operate on the principle that a liquid having relatively heavy molecules is vaporized in the pump by raising its temperature. The vapor comprising heavy molecules is directed by suitable nozzles in a direction away from the region to be evacuated, towards a mechanical forepump. The accelerated molecules of vapor compress against molecules ahead of the nozzle, forcing them toward the mechanical forepump and thereby reducing the pressure within the evacuated region. The vapors are recondensed on a cool wall of the pump where the liquid is permitted to return to the bottom of the pump to be reheated and vaporized.

Originally mercury was employed as the working fluid in these diffusion pumps, but later various organic oils and silicone fluids were developed as pump fluid, and today these fluids have almost completely replaced mercury in diffusion pumps. In particular, the silicone oils, of which DC-705 (pentaphenyl trimethyl trisiloxane) manufactured by Dow Corning Corp., is an example, are in wide use today.

Performance of diffusion pumps has been erratic and subject to certain limitations. It was long ago observed that the evaporative surface of a studied pump fluid in a pot still, when rapidly evaporating, seems to separate into two different areas of turbulence, resulting in a "schizoid" evaporative surface. In one area of the surface, termed the "working" area, very rapid evaporation of the fluid takes place, while in the other area, known as the "torpid" area, very little evaporation takes place. A discussion of this phenomena is found in the article "Torpid Phenomena and Pump Oils", K. C. D. Hickman, *The Journal of Vacuum Science and Technology*, Volume 9, No. 2, and "Surface Behavior in the Pot Still", K. C. D. Hickman, *Industrial and Engineering Chemistry*, Volume 44, No. 8. Since the torpid areas of the evaporative surface within the diffusion pump boiler release vapors at a very low rate, the diffusion pump speed, throughput and ultimate vacuum attainable are limited to the extent that the evaporative surface is affected by torpidity.

Various remedies have been suggested to alleviate or overcome the problem of torpidity in diffusion pump boilers. See, for example, the above article by Hickman, Hickman U.S. Pat. No. 2,080,421, and "A New Type of Diffusion Pump Boiler for Ultrahigh Vacuum Use", H. Okamoto and Y. Murakami, Vacuum, Volume 17, No. 2. The suggested solutions include the use of a central purge sump within the boiler for segregating certain impurities which overflow therein during boiling; the use of a boiler heater designed to induce tremendous turbulence in the pump fluid (Stevenson Flash Boiler); and various means for circulating the pump fluid in the boiler. The latter means include stirring or otherwise rotating the fluid mechanically, and positioning the applied heat so as to induce circulation (N-boiler of Murakami). Numerous diffusion pump boiler modifications are shown and described at pages 974–976 of the first above-referenced Hickman article.

While then suggested solutions have reportedly increased molecular throughput somewhat, they do not have the capability to purify the pump fluid within the boiler thereby eliminating the causes of torpidity, as discussed below. The exception is the purge sump, which does remove a limited quantity of impurities from the surface of the evaporating liquid. As long as torpid areas of the evaporative surface prevail, molecular throughput and attainable vacuum remain drastically limited.

Another limitation in diffusion pumps on ultimate attainable vacuum is imposed by a phenomenon known as "backstreaming". Backstreaming, also known as "reverse fractionation", constitutes a back migration of some molecules from the jets back into the vacuum chamber and is inherent in a diffusion pumping process. As pressure in the chamber being evacuated decreases, the rate of backstreaming increases, and when it equals the throughput of gas, no further decrease in chamber pressure occurs. The phenomenon of backstreaming, and various suggested remedies therefor, are discussed in Hickman U.S. Pat. Nos. 3,034,700 and 2,080,421, Scatchard U.S. Pat. No. 2,905,374, Nelson U.S. Pat. No. 2,291,054, Bachler U.S. Pat. No. 3,317,122 and Hayashi U.S. Pat. No. 3,171,584. For example, in Hickman U.S. Pat. No. 3,034,700 and in Bachler U.S. Pat. No. 3,317,122 it is suggested that backstreaming can be reduced by cooling the diffusion pump barrel only behind the jet or adjacent the upper stages of a multi-stage jet assembly, with the lower portions of the diffusion pump barrel being maintained warm. This reportedly maintains a long column of forwardly moving pump fluid vapor, giving the molecules less chance to diffuse backstream. Another often employed way of reducing backstreaming is the use of one or more cryogenically cooled baffles between the vacuum chamber and the pump. The baffle primarily attempts to condense and trap contaminant gases from the chamber and to prevent diffusion pump vapors from backstreaming into the chamber. Many of the chamber gases originate from materials in the chamber which have "outgassed" under the influence of high vacuum. While cooled baffles have been helpful in trapping chamber gases and reducing backstreaming, they have not been able to trap all passing gases, and once they are filled with condensate, they lose their effectiveness. If the baffle is warmed, the condensables drip into the boiler and cannot be removed.

Although molecules of the pump fluid itself exiting the diffusion pump jets have a tendency to backstream to a slight degree, it is primarily molecules of "light ends" which backstream through the diffusion pump barrel toward the lower pressure vacuum chamber, thus severely limiting the degree of vacuum attainable. "Light ends" are those contaminants present with the pump fluid which are of lower molecular weight than the pump fluid itself, and may include broken away fractions of molecules of the pump fluid itself, which is, in the case of the pump fluid DC-705, a pentamer. One system for partially removing light end contaminants from the pump fluid, thereby reducing backstreaming, is shown in Hickman U.S. Pat. No. 3,034,700, FIG. 1, and in the first above-referenced Hickman article, FIG. 25 and page 976. This system consists of collecting condensed distillate in annular alembics defined in the foreline of the diffusion pump. The distillates comprise light end substances which have escaped the diffusion pump barrel and passed along with vacuum chamber gases into the foreline.

In Hickman U.S. Pat. No. 2,080,421, wherein total pump fluid constituents, including impurities, are identified by letters A through Z from the lightest light ends through the heaviest ends, diffusion pump apparatus is disclosed wherein certain impurities were isolated within internal compartments. However, only contaminating components A, B and Z are disclosed as having been successfully isolated.

While the diffusion pump structures discussed and referenced above aid in the reduction of torpidity on the fluid's evaporative surface within the boiler and in the reduction of backstreaming by light end substances into the vacuum chamber, thereby increasing ultimate attainable vacuum, the suggested structures cannot produce a 100% continuously working evaporative surface, nor reduce backstreaming and achieve high fluid separation to the extent of the present invention described below.

SUMMARY OF THE INVENTION

The present invention provides a diffusion pump, including modifications to existing large diffusion pumps, capable of continually cleansing the working fluid during operation, thereby producing a continuous, 100% working evaporative surface, as well as drastically reducing backstreaming, which heretofore has severely limited ultimate attainable vacuum. The diffusion pump apparatus of the invention is also capable of achieving a high degree of separation among fluids of slightly different volatility, and thus has utility in the field of refining and other arts involving high purification and separation of fluids.

It has been found that the torpidity phenomena, which has been the subject of study for some years as discussed above, is due almost entirely to the presence of "heavy end" contaminating substances present in the pump fluid. The heavy ends comprise substances of molecular weight higher than that of the pump fluid, and include to a large extent polymerized molecules of ligher substances. These heavy ends tend to collect into nonevaporating "islands" on the evaporative surface, restraining the release of motive fluid molecules in these areas. Thus, only the working "holes" in the schizoid evaporative surface release fluid molecules at an appreciable rate.

The diffusion pump apparatus of the present invention is capable of almost totally eliminating heavy end substances from the pump fluid during operation of the pump, thereby removing the principal cause of torpidity on the evaporative surface. This helps provide for a vigorous, 100% working surface, resulting in a much greater molecular throughput and greatly improved pump efficiency. The elimination of heavy ends is accomplished in part by the periodic skimming of the evaporative surface of the pump fluid in the boiler during operation. Skimming outlets are located around the periphery of the boiler and also toward the center of the boiler in large pumps having concentric annular boiler channels. The skimming openings are provided at various levels on the boiler and are connected, when skimming valves are opened, to a collection vessel existing at lower internal pressure than that of the boiler.

The diffusion pump apparatus of the invention also includes means for withdrawing condensed distillate from the forepressure line of the pump. Alembics are provided in the foreline for catching condensates flowing down the internal walls thereof. Valved lines connect the alembics with a collection vessel of lower internal pressure than that of the foreline. Condensates within the foreline contain high concentrations of "light end" substances, and the removal of these light ends prevents their return to the boiler for revaporization and possible polymerization into heavy end molecules. In this way, backstreaming is nearly eliminated, since most light ends are prevented from re-entering the flow of vapors through the diffusion pump jets. The presence of light ends in the diffusion pump barrel is the primary cause of backstreaming, which greatly reduces ultimate attainable vacuum in a vacuum chamber-diffusion pump system. As indicated above, the prevention of light ends from returning to the boiler also reduces torpidity by eliminating polymerized molecules therefrom.

Light end contaminants cannot be completely eliminated from the system via the foreline. Usually there is present a very small quantity of light ends of molecular weight only slightly above that of the pump fluid itself. For maximum pump performance, these substances must be removed. They are difficult to isolate in the foreline, where pressure is relatively high and pressure differences are only slight, and where the concentration of such heavy light ends is generally not as great as it is in the pump barrel. The heavy light ends, not being as volatile as the lighter light ends which may be isolated in the foreline, condense on the diffusion pump barrel walls nearly as readily as does the motive fluid. Therefore, molecules of the heavy light ends are continually present in the diffusion pump barrel and available for backstreaming toward the vacuum chamber and for combining by polymerization to form heavy end contaminants which cause torpidity in the boiler. Being somewhat more volatile than the pump fluid itself, the uncombined heavy light end molecules tend to backstream more readily than those of the pump fluid, toward the lower pressure of the vacuum chamber. If after separation and removal of most light light ends from the foreline, pressure could be made sufficiently low, with a sharper gradient, and temperature sufficiently high in the foreline, the heavy light ends could be drawn in greater concentration into the foreline before condensation, condensed therein and trapped within the alembics. The substances would thus be present in high concentrations within the condensate and could be drawn off from the alembics. However, to achieve such separation would require an extremely strong roughing or backing pump connected to the foreline, and extremely high temperatures within the foreline. In most situations, such a large vacuum pump would be required to achieve the separation as to be impracticable and economically unfeasible. Also, any ligher light ends present at the time under such conditions would necessarily be drawn away through the roughing pump and exhausted. These light light ends would thus be lost and unavailable for separation and analysis or salvage.

A solution to the problem of the trace quantities of heavy light ends present in the diffusion pump barrel is provided according to the present invention. On the internal surface of the diffusion pump barrel where pressure is low and a strong pressure gradient exists, are a series of alembic-like plates or gutters which are positioned so as to trap a major portion of the heavy light end substances which have condensed on the barrel surface, before these condensates have a chance to revaporize and backstream toward the vacuum chamber. Valved draw off lines lead from each of the gutters to a collection vessel of lower pressure than the barrel pressure at the level of that particular gutter. Certain of the gutters are provided with draw off lines at more than one level, so that motive fluid condensate, which may be present in the bottom of certain gutters, can be returned to the boiler, while condensates containing heavy light end contaminants can be drawn off from upper levels of the gutters into a collection vessel.

In a vacuum system including a number of diffusion pumps, one pump having all of the above-discussed modifications can act as a "slave" pump to the remaining pumps having only boiler and foreline modifications. Boiler fluid would be exchanged between the pumps so that the fluid of each pump would reach a high degree of purification.

As discussed above, the apparatus of the present invention also has utility as a precision fluid separation device. Apparatus described below for boiler surface skimming and for collecting and separating condensates in the foreline and on the barrel of a diffusion pump can be utilized in other separation arts apart from diffusion pumps, such as those relating to the separation of petroleum fractions, uranium isotopes, metals, and other organic and inorganic chemicals.

The diffusion pump apparatus of this invention is illustrated and described herein in connection with an umbrella or mushroom type inverted-nozzle pump of the type shown in U.S. Pat. Nos. 2,206,093, 2,386,298, 2,436,849, 2,905,374, 3,251,537, 3,317,122 and 3,536,420. A model diffusion pump embodying some of the improvements of the invention was constructed and operated, the results of such operation being discussed in National Aeronautics and Space Administration Technical Memorandum X-68272, published Nov. 12, 1973 and presented at the Seventh Space Simulation Conference, Los Angeles, California, Nov. 12-14, 1973. Remaining improvements according to the invention are discussed in NASA Technical Memorandum X-2932, to be published in or prior to January, 1975.

DESCRIPTION OF THE DRAWINGS

FIG. 1 is a schematic elevational view showing a vacuum chamber and connected model diffusion pump including apparatus according to the present invention;

FIG. 2 is an enlarged view of the model diffusion pump;

FIG. 3 is a sectional elevational view of a typical prior art large mushroom-type diffusion pump;

FIG. 4 is a sectioned perspective view of the boiler of a typical prior art large diffusion pump;

FIG. 5 is a sectional elevational view showing modifications to a prior art diffusion pump according to the present invention;

FIG. 6 is a sectional plan view taken along the line 6—6 of FIG. 5; and

FIG. 7 is an enlarged sectional elevational view taken along the lines 7—7 of FIG. 6 with parts removed fro clarity.

DESCRIPTION OF THE PREFERRED EMBODIMENTS

A. LABORATORY MODEL DIFFUSION PUMP

FIG. 1 of the drawings shows a vacuum chamber 10 connected to the low pressure side of a model self-cleansing diffusion pump assembly according to the invention, generally indicated by the reference number 11. The assembly 11 includes a diffusion pump barrel 12, a chimney and nozzle assembly 13, a boiler 14, a fore-pressure line 16 including alembics 17 and valved draw off lines 18, a line 19 leading through a foreline cold trap 21 to a mechanical backing pump 22, vessels 23 and 24 for collecting contaminants removed from the boiler 14 and the foreline 16 respectively, a foreline pressure gauge 26, a blower 27 for cooling the diffusion pump barrel 12, and a boiler contaminant adding device 28. Included on the vacuum chamber are a pressure gauge 29, a chamber contaminant adding device 31 including a valve 32, an auxiliary bleed valve 33, and a chamber baffle 34 which may be chilled to provide a refrigerated condensing trap for gaseous substances travelling toward the diffusion pump barrel 12. An additional baffle 37 and valve 38 may be provided between the valve 36 and the diffusion pump barrel 12. The contaminant collection vessels 23 and 24 are connected by valved lines 39 and 41 to a source of lower pressure than that existing within the diffusion pump boiler 14 and foreline 16 so that the vessels 23 and 24 will draw liquids from the boiler 14 and the alembics 17, respectively, when the appropriate valves are opened. The vacuum source may be the machanical backing pump 22 itself or some other suitable source, since the pressure existing within the boiler 14 and foreline 16 during operation of the pump assembly 11 are not extremely low, as is the pressure within the upper end of the diffusion pump barrel 12. Contaminant drain valves 35 and 36 are provided on the vessels 23 and 24 for removing contaminants when the vessels 23 and 24 are appropriately isolated from the source of vacuum and from the boiler and foreline. Atmospheric bleed valves 40 and 45 are also provided on the vessels 23 and 24 for the same purpose.

A portion of the diffusion pump assembly 11 is shown in greater detail in FIG. 2. The boiler 14 contains motive fluid 42 up to the level of a skimming drain line 43 which is open to the interior of the boiler. The line 43 can be opened by a valve 44 to a line 46 leading to the collection vessel 23. On the opposite side of the boiler 14 is the contaminant adding device 28 which includes an open-ended graduated tube 47 and a valve 48 for admitting liquids from the tube 47 into the interior of the boiler 14. Such contaminating liquids may be added to determine their effect on pump performance and the ability of the purification apparatus of the model pump to separate the liquids out of the pump fluid, as discussed below. The device 28 may also be used to replenish pump fluid in the boiler 14 as heavy and light end constituents are skimmed and drawn off. The fluid level shown in FIG. 2 should be maintained through all skimming operations, since skimming is provided only at one level in the model pump. The chimney and nozzle assembly 13 includes nozzles or jets 49a, 49b and 49c which are angled downwardly to create, when pump fluid passes therethrough, a low pressure on the high vacuum side 51 of the diffusion pump. At the bottom of the diffusion pump barrel 12, several openings 52 are provided around the periphery of the chimney and nozzle assembly 13 so that any fluid condensing on the lower interior of the chimney and nozzle assembly 13 returns to the boiler 14 by passing into the foreline entrance and thence down through a conduit 53, rough the line 43 and into the boiler 14. Similarly, condensate from the surface of the barrel 12 returns to the boiler via the lines 53 and 43.

The foreline 16 of the diffusion pump includes a pair of peripheral alembics 17a and 17b, and lines 18a, 18b and 18c are provided to conduct condensed fluid away from the foreline 16. Each of the lines 18 may be opened by a valve to a light end collection vessel 24 of lower pressure than that of the foreline 16, as shown in FIG. 1. The lower line 53, which remains open to the interior of the boiler 14, returns to the boiler those condensates which have not been removed through the lines 18. Electric heating tape 54 is wrapped around the foreline 16 from just above the line 53 to just below the backing pump line 19, so that temperature within the foreline 16 can be maintained at a predetermined, nearly consistent level along the length of the foreline. This allows condensable fluids entering the foreline in the gaseous state to travel farther up the foreline 16 before condensing on the walls thereof, and with temperature nearly constant along the foreline's length, light end substances of differing volatilities are allowed to condense at different levels under the influence of subtle variation in pressure along the length of the foreline 16. The highest pressure in the foreline is found adjacent the backing pump line 19, and the lowest pressure is found closest to the diffusion pump barrel 12.

As FIG. 2 indicates, a valved bottom drain line 56 is provided in the boiler 14 for draining the pump fluid 42 out of the boiler when the diffusion pump is not operating. The glass walls of the boiler 14 include thermocouple inserts 57 and 58 for monitoring the temperature at various positions within the boiler 14. The thermocouple inserts 58 extend from the back of the boiler. The foreline 16 also includes a thermocouple insert 59 for monitoring temperature at the position shown. Foreline pressure is monitored via the pressure gauge 26 shown in FIG. 1, while chamber pressure is monitored by the gauge 29, also shown in FIG. 1.

In a particular run of the model self-cleansing diffusion pump assembly 11, five year old DC-705 silicone pump fluid (molecular weight 546) taken from the cyclotron diffusion pump at Michigan State University was used in the boiler 14 of the model pump. The oil had been discolored by long use to a dark brown color. In an initial standardizing test conducted with a standard G-4 single stage glass diffusion pump, the five year old oil had attained a maximum vacuum, or minimum pressure, of $2.5 \times 10^{-5}$ torr (mm. of mercury) in four hours of pump operating time. New DC-705 oil had achieved a minimum pressure of $1.0 \times 10^{-6}$ torr in three and one-half hours operation in the G-4 test pump. The boiler size and evaporative surfaces area of a G-4 single stage pump are approximately the same as those of the model pump. Each pump has a boiler capacity of about 55 milliliters.

After one day of operation in the model diffusion pump shown in FIGS. 1 and 2, the five year old DC-705 oil produced a maximum test chamber vacuum of $5 \times 10^{-5}$ torr. The reason for the difference in ultimate vacuum between the G-4 test pump and the model pump illustrated in the figures, using the same five year old pump oil, is primarily that the model pump including a large number of joints between the diffusion pump barrel 12 and the vacuum chamber 10 (some of which are seen in FIG. 1). These joints were not perfect but allowed a small amount of gas leakage into the system, consistently raising minimum attainable pressures in the system in all tests with the pump. Outgassing of gasket materials around joints also contributed to the gas load in the system.

During the first day of operation of the five year old oil in the model diffusion pump, chamber pressure often varied from about $10^{-4}$ torr to $5 \times 10^{-5}$ torr. A torpid evaporative surface appeared approximately 80% of the time. For brief periods the evaporative surface would become 100% working. Between torpid and working periods, a surface previously described as schizoid would appear briefly, with numerous small working "holes" present in the otherwise torpid surface. Improved chamber pressure always accompanied the 100% working periods, often lowering chamber pressure by 0.5 decade (five times). The 100% working evaporative surface appeared about 20% of the time during the first day of operation.

When removal of light end and heavy end contaminants from the pump fluid commenced, marked increases in pump performance immediately became apparent. Within eight hours from the first separation of such impurities, chamber pressure was lowered by more than one decade to a level of $1 \times 10^{-6}$ to $5 \times 10^{-6}$ torr. During approximately the second day of pump operation, the following quantities of fluid containing the indicated contaminants were removed, in the indicated order:

10 ml light ends
3 ml light ends
8 ml heavy ends
2 ml light ends
2 ml light ends Following the removal of these contaminants, a chamber pressure varying between $8 \times 10^{-7}$ and $1 \times 10^{-6}$ torr was attained. The corresponding boiler evaporative surface behavior associated with this pump efficiency was 100% working 90% of the time.

After seven days of system operation, chamber vacuum reached improved levels of between $5 \times 10^{-7}$ and $1 \times 10^{-6}$ torr. The 100% working evaporative surface now appeared approximately 99% of the time.

During the eighth day, a further 2 ml of pump fluid containing light ends was removed from the foreline. Following this final purification, a continuous 100% working evaporative surface appeared. Chamber pressure remained between $10^{-7}$ and $10^{-6}$ torr.

During this run of the model diffusion pump, when chamber pressure was varying from about $5 \times 10^{-7}$ and $1 \times 10^{-6}$ torr, a test to determine the effectiveness of the chamber baffle 34 (see FIG. 1) was conducted. The chamber baffle 34 had been maintained at temperatures varying between $-40°$ F. and $-20°$ F. When the baffle was warmed to a temperature of $+40°$ F., chamber pressure rose to about $5 \times 10^{-3}$ torr, due to vaporization of warmed condensates which had been detained by the chamber baffle. However, the system later recovered from this pressure rise, and in fact when chamber baffle temperature exceeded $60°$ F., vacuums of around $10^{-6}$ torr were again attained and maintained. These results confirm that when diffusion pump oil is maintained in an extremely high purity condition, high vacuum can be attained merely with the use of a water cooled chamber baffle. Water cooled baffles could save enormous expense at space performance testing facilities, for example, where each of a large number of diffusion pumps usually employs a chamber baffle cooled with costly cryogens such as liquid nitrogen or liquid helium.

During the above test of the self-cleansing model pump, foreline pressure gradually and steadily decreased as chamber pressure decreased and as the continuous 100% working evaporative surface condition was approached, from about $4 \times 10^{-3}$ torr to about $2 \times 10^{-3}$ torr. During this period, foreline temperature, controlled by the electric heating tape 54 shown in FIG. 2, remained at about 260° F. and did not vary significantly. The gradual lowering of pressure in the foreline thus steadily changed the conditions of equilibrium within the foreline, such that a substance of a particular vapor pressure would condense at a continually rising level in the foreline as pressure decreased. Thus a particular substance which may have condensed near the entry to the foreline after only several hours or a day of pump operation (prior to purification of the pump fluid) may later condense just above the lower alembic 17b, being trapped therein. Still later, the same substance may reach an even higher position of condensation within the foreline 16, thereby flowing into the upper alembic 17a for collection.

Because of this steady change of conditions, or equilibrium parameters, within the foreline, the lightest, most volatile light ends are the first light end contaminants to be collected in the forearm alembics 17a and 17b. The alembics are drained of these lightest light end substances (the drain line 18c may also be opened), and pressure in the foreline progresses downwardly. The next cut of light ends from the foreline occurs when pressure is somewhat lower, so that contaminants contained in the fluid removed from the alembics now comprise somewhat heavier, less volatile light light ends. If any of the lightest, most volatile light ends are still present within the system, they would be likely to be passed completely out of the foreline, through the line 19 toward the mechanical backing pump, under the new conditions. Thus, the initial light end cut should be sufficient to remove nearly all of these most volatile substances, particularly, if separation and salvage of the substances is desired. As the operation of the system progresses, light end contaminants continue to be removed. Ultimately, the heaviest, least volatile light end substances can be largely removed from the foreline. As previously discussed, under any set of equilibrium conditions existing in the foreline at a given time, there is a slight variation in pressure along the length of the foreline 16. The pressure varies from lowest at the upstream end of the foreline to the highest at the downstream end adjacent the backing pump line 19. Light end substances of varying volatilities can thus be drawn from the lines 18a, 18b and 18c during operation of the pump.

After the initial drawing off of light ends and substantial stabilization of foreline pressure, further light end removal may be accomplished by draining only the upper alembic 17a through its draw off line 18a. This results from the fact that once foreline pressure has reached a minimum, primarily the heavier light ends are being trapped by the alembics 17a and 17b. Most of the light end condensates within the lower alembics 17b will revaporize from time to time, travelling farther up the forearm to be eventually recondensed higher along the walls of the foreline 16, adjacent the backing pump line 19 where temperature is somewhat lower. This, most of such condensates eventually are trapped by the upper alembic 17a.

The model self-cleansing diffusion pump system shown in FIGS. 1 and 2 was also tested using new DC-705 oil. After three days of operation, the vacuum chamber pressure gauge 29 indicated chamber pressure to be a consistent $5 \times 10^{-5}$ torr. A 100% working evaporative surface existed about 10% of the time. When 6 ml of fluid containing light end impurities were removed from the foreline, 2 ml from each of the drain lines 18a, 18b and 18c, chamber pressure fell by 0.6 decade. The evaporative surface became 100% working 25% of the time. On the fifth day, the removal of approximately 7 ml of boiler fluid containing heavy end fractions, by skimming the evaporative surface, increased the 100% working surface condition to 50% of the time, with a slight reduction in chamber pressure. Following an additional removal of 3 ml of light ends containing condensate from the top alembic, on the sixth day, chamber pressure decreased, reaching an ultimate level of from $7 \times 10^{-7}$ to $2 \times 10^{-6}$ torr. Eventually a continuous 100% working evaporative surface was achieved, following a further removal of 4 ml fluid from the upper alembic in the foreline.

The foregoing test provided convincing evidence that even new unused DC-705 silicone oil contained some light end and some heavy end impurities, and that the model pump 11 is capable of a very high degree of separation and purification. Minimum pressure attainable in the test chamber was reduced from about $5 \times 10^{-5}$ torr to about $1 \times 10^{-6}$ torr, or about 1.5 decades, by the removal of light end and heavy end substances during operation of the pump.

Other tests were conducted using the model self-cleansing diffusion pump assembly illustrated in FIGS. 1 and 2. In one test, new DC-705 oil which had been further purified in the model pump as described above, was deliberately contaminated to determine the effect of certain contaminants on pump operation, and the ability of the model pump to eliminate them. This test was actually a continuation of the above run of the pump using new DC-705 oil, beginning with the 13th day of operation. The contaminants added were three common phthalate plasticizers which have been found to outgas from many of the articles present in a space simulation chamber. The three phthalate contaminants added were: di-isooctyl phthalate (DIOP-390 molecular weight); di-isodecyl phthalate (DIDP-446 M.W.); and di-octyl phthalate/di-2-ethylhexyl phthalate (DOP/DEHP-390 M.W.). 2 ml of each contaminant were added directly into the pump fluid through the boiler contaminant adding device 28. The effect was an immediate, sharp rise in chamber pressure from about $10^{-6}$ torr to about $2 \times 10^{-3}$ torr, with chamber pressure stabilizing at about $7 \times 10^{-4}$ torr. With the removal of 4 ml fluid from the top alembic of the foreline, chamber pressure dropped to $2.5 \times 10^{-5}$ within one hour. The insertion into the boiler of an additional 2 ml of phthalate contaminant mixture (containing the above three components), the previous pressure fluctuation was duplicated. 10 ml of new DC-705 was added through the device 28 to prevent depletion of the boiler fluid supply during the pending cleansing period. To purify the fluid, 2 ml of fluid containing light end fractions were removed from the upper alembic 17a of the forearm 16. This operation was repeated again within 30 minutes. Within one hour, chamber pressure was reduced 3 decades, from $3 \times 10^{-3}$ torr to $2.5 \times 10^{-6}$ torr.

15 hours later, a chamber pressure of $8.5 \times 10^{-7}$ torr was achieved.

The operation of the model diffusion pump assembly described above established that a high level of motive fluid purity can be attained and maintained by utilization of the contaminant removal apparatus shown and described. The model pump further demonstrated that once heavy end contaminants have been initially skimmed from the evaporative surface in the pump boiler, heavy and light end contaminants both can be controlled to a large extent merely by periodic withdrawal of condensates from the foreline. This is due to the fact that after an initial skimming most recurring heavy ends in the boiler comprise polymerized molecules made up of light end molecules or light end molecules in combination with molecules of the basic motive fluid.

As discussed above, the model diffusion pump was subject to a number of limitations. Among these limitations were the large number of joints employed in the vicinity of the diffusion pump barrel and the foreline, and the size of the model diffusion pump. Nonetheless, the separation and purification capabilities of the model pump demonstrated that greatly improved pump performance can be attained employing the two types of modifications shown. An even higher degree of purification and contaminant separation can be attained with a third diffusion pump modification described below in connection with large existing pumps. The third modification, which could not be incorporated in the glass model pump, relates to apparatus within the diffusion pump barrel itself for separating out the extremely small quantities of light end substances which are only slightly below the molecular weight and slightly above the vapor pressure of the motive fluid itself. The separation of this type impurity cannot be completely accomplished within the diffusion pump foreline.

B. MODIFICATION OF LARGE DIFFUSION PUMPS

A typical large diffusion pump 65 of the mushroom or inverted-nozzle type is shown in FIG. 3. The pump 65 includes a concentric channel boiler 66, disposed at the bottom of a chimney and nozzle assembly 67. The boiler 65 includes electrical resistance heating elements 68 disposed between concentric boiler channels for providing a large heating area, and a metal dome 69 receives conductive heat from the electrical heating elements 68 for assuring the vaporization of pump fluid striking it. The boiler includes a valve drain line 71. Surrounding the chimney and nozzle assembly 67 is a barrel 72 about which a cooling jacket 73 containing cooling lines 74 is usually wrapped. The pump includes a foreline elbow pipe 75 leading through a foreline (not shown) to a mechanical backing pump (not shown).

Referring to FIG. 4, the boiler 66 of the typical prior art diffusion pump 65 of FIG. 3 is shown in greater detail. The boiler 66 includes three separate concentric annular boiler channels 78a, 78b and 78c. The electrical resistance heating elements 68 are enclosed within conductive metal heating rings 79a and 79b, and 78b and 78c. Communication is provided among all the boiler channels 78 by a break in the heating rings 79a and 79b. As seen at the left in FIG. 4, the rings 79a and 79b terminate in the vicinity of the drain line 71 and thus are C-shaped. An annular flange 81 extends into the boiler from the chimney and nozzle assembly 67 above to prevent the travel of vaporized pump fluid directly into the diffusion pump barrel 72 rather than through the chimney 57 (see FIG. 3). The flange 81 does not reach the boiler bottom. The boiler 66 is designed to maximize contact between the motive fluid and heated surfaces. Some boilers include additional heating fins extending through several of the boiler channels 78 in zigzag fashion for additionally increased surface contact.

FIG. 5 shows a diffusion pump assembly 85 similar to the prior art diffusion pump 65 shown in FIGS. 3 and 4 but including self-purification and separation modifications according to the invention. The modified pump 85 includes a boiler 86 with electrical resistance heating element rings 87, a dome 88, a filling and drain line 89, a chimney and nozzle assembly 90, a barrel 91 encircled by cooling jackets 92 and a foreline 93 connected through an opening 94 to a mechanical backing pump (not shown). Heating means is provided about the foreline 93, and may comprise electric heating tape 95 wrapped around the foreline and covered by an insolating jacket 95a.

As indicated in FIG. 5, the boiler 86 of the diffusion pump 85 is modified to provide evaporative surface skimming means from inner and outer positions. On the inner side of the boiler 86 within the dome 88 are skimming tubes 96a, 96b, 97a, 98a and 99a, communicating through openings in the base of the dome 88 with the interior of the boiler at preferably four different levels. Opposite skimming tubes 97b, 98b and 99b at the levels of 97a, 98a and 99a, respectively, are seen in FIG. 6. All of the skimming tubes are connected through valves 100 with a heavy end collection vessel 101. The vessel 101 is connected through a valve line 102 with a source of lower pressure than that within the boiler 86. A valved drain line 103 and a valved atmospheric bleed line 104 are also provided for periodically draining the liquid from the collection vessel 101. Several outer skimming lines 106a, 106b, 107a and 108a are also seen in FIG. 5. These outer skimming lines are connected to a separate heavy end collection vessel 109. The vessel 109, like the vessel 101, has valved lines 111, 112 and 113 connected to a vacuum source, a drain sump and the atmosphere, respectively. The reason for separate collection vessels 101 and 109 for inner and outer boiler-skimmed residues is that heavier heavy ends, which largely comprise polymerized light ends, tend to be higher in concentration toward the boiler's periphery, where temperature is somewhat lower due to the presence of returned condensates from the barrel wall. Lighter heavy ends remain toward the boiler center. Thus, the skimming apparatus herein described provides for separation between the two ranges of heavy ends, if desired.

FIGS. 6 and 7 indicate the various positions of the boiler skimming lines. An additional valved outer line 114a, not seen in FIG. 5, connects with the back side of the boiler 86, with a frontal line 114b at the same level. Lines 107b and 108b extend from the front of the boiler 88 at the level of lines 107a and 108a, respectively. The inner and outer skimming lines provide for boiler surface skimming at preferably four different levels, as indicated in FIG. 7. Inner lines 96a and 96b and outer lines 106a and 106b are preferably positioned at the level of full boiler capacity, which is the four gallon level in many typical diffusion pumps. An opening 105 is provided in the chimney flange 110 (similar to flange 81 of FIG. 4 pump) of the pump 85 to provide for surface communication throughout the boiler 86, as seen in FIG. 6. At preferably about 5 millimeters below the boiler capacity level are the inner skimming tubes 97a and 97b and the outer skimming tubes 114a and 114b. The tubes 98a, 98b, 107a and 107b are preferably about 10 millimeters below the capacity level, while the tubes 99a, 99b, 108a and 108b are at about 15 millimeters below the capacity boiler level. The multiple skimming levels provide for surface skimming when the pump fluid is at various levels below full, as well as at the full level. This allows for the loss of portions of the pump fluid after various stages of contaminant removal. Means (not shown) can be provided for automatically opening the proper skimming lines in correlation with the boiler fluid level, which can be ascertained by a sensor. Means (not shown) can also be provided for determining when skimming is required, by sensing evaporative surface behavior and/or vacuum chamber pressure.

Referring again to FIG. 5, the foreline 93 of the modified diffusion pump 85 is shown with purification and separation modifications. The interior surface of the foreline 93 includes a series of alembic-like gutters or troughs 116, 117, 118, 119 and 120. In addition, an elbow 122 of the foreline includes traps 123, 124 and 125 for catching condensates as they flow down along the elbow wall toward the boiler. The varies levels for condensate removal, from the top to the bottom of the foreline, provide for trapping of condensates of varying volatility, as discussed in connection with the model pump, and separate collection thereof. Two valved lines, referenced by 116a and 116b, 117a and 117b, etc., extend from an upper level and from the bottom of each gutter and trap, respectively. The reason for the bi-level fluid outlets is that the bottom of each gutter or trap, particularly in the traps and lower gutters, will usually contain nearly pure motive fluid. On the other hand, the upper levels of the gutters and traps will contain fluid having high concentrations of condensed light end substances. Thus, the lines 116b, 117b, 118b, etc., which lead into a collection vessel 127, are used primarily for recovering the basic motive fluid from the gutters and traps. The vessel 127 includes a valved drain line 128 and valved lines 129 and 130 connected to a source of lower pressure than that of the foreline and to the atmosphere, respectively. The valved lines 116a, 117a, 118a, etc., from the upper levels of the gutters and traps may be connected to separate collection vessels (not shown) if separation of fluids containing light end contaminants of varying volatilities is desired. Each collection vessel would be provided with a drain line, a line leading to the source of lower pressure, and a bleed line to the atmosphere, as with the vessel 127. If separation is not desired, the upper level gutter and trap line may lead to a common collection vessel.

For maximum fluid separation in the foreline 93, with somewhat lowered throughput and consequently reduced vacuum production, each of the gutters 116 through 120 can be provided with a condensing baffle above (not shown for clarity). In addition, packing (not shown) can be provided in each gutter to increase effective condensing area. Such packing might comprise, for example, stainless steel or another inert material in wire mesh or finely spun form.

A heating jacket 132 is positioned about the entire foreline 93 and functions in the same manner as the heating tape described above in connection with the model diffusion pump assembly 11. In addition to this function of bringing light end substances to high enough levels within the foreline for condensation and trapping in appropriate gutters, the heating jacket 132 also aids in the separation of light ends from the motive fluid within the gutters and traps, and their withdrawal through the lines 116a, 117a, 118a, etc. At each gutter, the foreline wall is warmer than the gutter itself and other points within the interior of the foreline. This causes fluids contacting the foreline wall to convect upwardly along the foreline wall, thus creating a circulation pattern within the gutter. The fluid circulation pattern is up along the wall, inward along the surface of the fluid, and then downward and outward along the bottom of the gutter toward the wall. This circulation pattern aids in bringing the lighter fluids toward the surface of the collected condensate. Since the light end fluid within each gutter is at conditions very close to its liquid-vapor equilibrium conditions, the light end condensate tends to move toward the liquid surface for incipient vaporization and actual vaporization to some extent. Polymerization of these light end fractions at gutter surfaces may also play an important part as to the ease in which a specific fraction is drawn from the surface into a vessel of lower pressure.

As discussed in connection with the model self-cleansing diffusion pump assembly 11, at the initial stages of pump operation the lightest light end contaminants are trapped within the lower traps 123, 124 and 125. This occurs because pressure within the foreline is relatively high, not having yet been effected by increased pump performance and progressively higher vacuum within the vacuum chamber connected to the low pressure side of the diffusion pump barrel 91. These light light ends should be initially removed as completely as possible via the lines 125a, 124a and 123a.

As in the operation of the model diffusion pump, progressively lowered pressures within the foreline 93 cause progressive changes in the average position of condensation for a given light end cantaminant. Thus, the light end-containing liquids drawn through the lines 125a, 124a and 123a initially will be higher in volatility than those later drawn therethrough, and if each fraction is to be separately collected, the collection vessels for each of the drain lines 125a, 124a and 123a will have to be drained at intervals. As in the model self-cleansing pump, once pressure within the foreline 93 has stabilized at minimum values, withdrawal of nearly all light end contaminants can be accomplished through one or several of the uppermost gutters 116a, 117a and 118a. This is because as maximum foreline vacuum is reached, only the heavier light ends will be condensing in the gutters. The lighter light ends will have been previously removed, or if any remain, will primarily be passed out of the foreline through the opening 94 toward the mechanical backing pump. At this point, many of the light ends in the lower gutters 120, 119 and 118 tend to revaporize from time to time and travel farther up the foreline, eventually recondensing in a higher level gutter and enriching the concentration of light end contaminant in that gutter. Thus most light ends remaining at this point can be removed through the upper gutter or gutters.

In the initial stages of operation of the diffusion pump 85 including the above-described foreline modification, the preferred procedure for light end contaminant removal is the sequential opening of the "a" skimming lines, beginning with the trap line 125a and ending with the uppermost gutter line 116a. the withdrawn condensates of each gutter or trap can then be analyzed to determine the distribution pattern of light end contaminants for a given pump fluid and a given set of chamber conditions after a given period of time of pump operation. This operation can then be repeated after various periods of time, and the results can be used to automate the removal of foreline light end contaminants. According to the results, the valves of the lines 125a, 124a, etc., through 116a can be programmed to be opened at predetermined times and for predetermined time periods for maximum light end contaminant removal and minimum withdrawal of the basic motive fluid. After conditions have been altered by increased pump performance and foreline pressure has dropped, as discussed above, fluid removal from the upper gutter line or lines can be timed to occur periodically according to past performance and analysis of withdrawn foreline condensates, or such removal can be made responsive to changes in vacuum chamber pressure. For example, if chamber pressure rises and is sustained at the higher level, fluid could be removed from the uppermost gutter line 116a for several seconds, since such increased pressure would indicate the presence of volatile contaminants. If a sensor determines that chamber pressure is fluctuating, indicating the probable occurrence of alternate periods of working and torpid evaporative surface, the presence of heavy end contaminants within the boiler would be indicated. As discussed above, after an early initial heavy end boiler skimming operation, recurring heavy ends in the boiler are likely to be primarily made up of polymerized light ends. Therefore, when such chamber pressure fluctuations are indicated, the foreline skimming valves can again be programmed to remove fluid from the uppermost gutter 116a. If the pressure fluctuations then persist, a second boiler skimming operation from the appropriate level could be mandated by the automatic system.

During periods when light end fluids are not being removed from the foreline, the series of gutters and traps creates a waterfall effect within the foreline. Each gutter fills with condensate and overflows into the next gutter or trap, and so on, eventually flowing through the elbow 122 of the foreline and returning to the boiler. In fact, the waterfall effect prevails continually, involving all gutters except those being drained at any given time.

It should be pointed out that fluids withdrawn from the traps and gutters of the foreline 93 will never be 100% pure light end contaminants. There will always be a significant portion of basic motive fluid within such withdrawn fluid. The apparatus described effects the enrichment of a particular light end contaminant in a particular gutter of the forearm, enabling the eventual removal of nearly all of that contaminant. As indicated above, the proper sequencing and timing of gutter fluid removal can result in a minimum removal of motive fluid using the multiple-gutter structure described. If the motive fluid within the withdrawn condensates is to be salvaged or if the light end contaminant from a particular gutter is desired in a more concentrated form, the withdrawn condensates can be separated by another means, such as a centrifugal molecular still as described in the above-referenced NASA Technical Memorandum X-68272.

For an additionally high degree of separation and purification not attainable with the above-discussed foreline and boiler modifications alone, diffusion pump barrel modifications shown in FIG. 5 may also be made. As indicated, the diffusion pump barrel 91 may include around its inner periphery condensate collection gutters 140, 150, 160 and 170. Between the gutters on the outside of the diffusion pump barrel 91 are the cooling jackets 92 which cool the barrel 91 for condensing the motive fluid and various contaminating fluids thereon. The cooling jackets 92 are interrupted at the level of each gutter for the provision of a heating band 134 which extends around each gutter and is broken only at the location of draw off lines described below. The bands 134 may comprise electric heating tape 95 employed to heat the foreline 93, around the barrel wall at each gutter.

The modified diffusion pump barrel 91 acts as a high purification-separation still, as does the modified foreline 93. However, the modified barrel 91 is capable of attaining a much higher degree of purification and separation than is the foreline 93, after the appropriate separation has been made by fluid withdrawal from the foreline gutters. After such separation, virtually the only remaining light end contaminants should be those very close in volatility to the basic motive fluid itself. As discussed above, foreline modifications can only remove a portion of these heavy light end contaminants, leaving the rest to backstream within the pump barrel and reduce ultimate attainable chamber vacuum to some extent. Since, as discussed above in connection with the analysis of used five year old DC-705 oil taken from the cyclotron diffusion pump at Michigan State University, the quantity of heavy light ends close in volatility and molecular weight to the motive fluid is quite small, the diffusion pump barrel modifications described herein are designed to separate out extremely minute quantities of contaminants within the diffusion pump barrel, possibly in the parts per billion range. Foreline purification is conducted first in order that substantially only heavy light end contaminants remain in the barrel along with the motive fluid.

The ultra-high purification capability of the modified diffusion pump barrel 91 depends in part on the existence therein of large variations in pressure at different levels. In the foreline 93 only microns or tenths of microns pressure difference exists throughout the foreline length, whereas decades of pressure difference exists in the barrel 91. For example, in the diffusion pump 85 of FIG. 5, pressure above the top gutter 140 after foreline purification may be around $10^{-8}$ torr, but around $10^{-7}$ torr near the gutter 150, in the $10^{-6}$ or $10^{-5}$ torr range adjacent the next lower gutter 160, and around $10^{-4}$ torr near the lowest gutter 170. The high degree of separation discussed can be achieved by utilizing this strong pressure gradient to condense heavy light end substances at varying levels depending upon volatility, and to separate such contaminants from the motive fluid itself. The operation is very similar to that of the modified foreline 93.

As in the foreline 93 as discussed above, the barrel gutters 140, 150, 160 and 170 can be provided with packing (not shown) for increased condensing area. Such packing can increase separation capabilities in the pump barrel 91.

A valved low pressure line 135 extends from the diffusion pump barrel 91 at a point above the highest gutter 140, where pressure is lower than that existing anywhere below in the diffusion pump barrel. This low pressure line 135 extends downward to serve a fluid collection system for each gutter in the manner described below. In addition, a valved line 136 extends from the lower end of the line 135, leading to a holding vacuum pump (not shown) which may be the same mechanical backing pump that is connected to the foreline 93. This pump provides preliminary pressure reduction for the collection system and in fact can serve one or several of the lower gutters by itself, since these gutters are at higher pressure ranges. A valve 137 in the line 135, which may be positioned as shown or higher or lower, depending upon pressures existing in the barrel 91, is provided toward this end.

At an upper position in the uppermost gutter 140, a valved fluid draw off line 141 is positioned to deliver fluid into a collection vessel 142. The line 141, when opened, withdraws condensates only from adjacent the upper surface of the fluid in the gutter 140, for reasons similar to those discussed in connection with the foreline modifications above. Since the collection vessel 142 must be at lower pressure than the pressure within the barrel 91 adjacent the gutter 140 in order to withdraw fluid from the gutter 140, it is connected by a valved line 143 to the low pressure line 135. The vessel 142, like all low pressure collection vessels previously described, is also provided with a valved drain line 144 and an atmospheric bleed line 145, which must be opened in order to drain the vessel 142. Extending from the bottom level of the gutter 140 is a valved gutter drain line 146 which connects into a lower gutter draw off line 151.

To withdraw surface condensate from the gutter 140, the line 143 is first opened to lower the pressure in the vessel 142. Then the line 141 is opened to draw fluid into the vessel 142. To drain the vessel 142, the lines 141 and 143 are closed, and the lines 144 and 145 are opened.

The fluid collection structure for the next lower barrel gutter 150 is similar to that above, with the reference numbers 151–156 describing similar elements. Fluid drained from the lower portion of the gutter 140 through the line 146 may be drawn into the collection vessel 152 along with fluid from the top of the gutter 150 or drained into the gutter 150 to enrich the concentration therein of the particular fraction present in the gutter 140 bottom. This can be accomplished by sizing of the line 146 such that liquid is able to drip down therethrough, even though there is a slight pressure differential between the gutters 140 and 150. Alternatively, after the surface condensate in the gutter 140 has been substantially withdrawn, the gutter 140 may be allowed to overflow into the gutter 150, thereby enriching the gutter 150 in the condensates of the gutter bottom 140.

The remaining diffusion pump barrel gutters 160 and 170 have fluid collection apparatus similar to that of the gutters 140 and 150 and numbered accordingly. The valved gutter drain line 176 leading from the lowermost gutter 170 is connected into a collection vessel 182 having a valved line 183 leading to the low pressure line 135 and having drain and bleed lines 184 and 185 similar to those above.

Toward the bottom of the diffusion pump barrel 91, a valved auxiliary boiler fluid add line 187 is provided, the purpose of which is described below.

In the initial operation of the diffusion pump assembly 85 including barrel modifications, all valves shown on the right side of the barrel 91 in FIG. 5, from the line 135 through the line 185, are normally closed. The valves all remain closed during foreline condensate removal operations. Prior to any condensate removal from the pump barrel 91, it is estimated that the motive fluid is between 98% and 99.8% pure. Maximum chamber vacuum attainable by boiler skimming and foreline purification has been attained, and may range, depending upon the motive fluid employed, from about $10^{-5}$ to $10^{-9}$ torr. Pump fluid expelled from the chimney and nozzle assembly 90 would of course continually be filling up the lower three gutters 150, 160 and 170. The upper gutter 140 is thus the primary location for removing backstreaming heavy light end contaminants. Most of such heavy light ends reach the barrel wall above the upper gutter 140 by backstreaming upward from lower points beneath the jets. To a much lesser extent, some of the heavy light end substances reach the gutter 140 as a result of outgassing in the vacuum chamber above.

Heavy light end molecules of course also condense lower in the barrel 91 and are collected in the gutters 150, 160 and 170. Some of these condensates can be recovered by surface removal through the lines 151, 161 and 171, such removal being aided by the heating of the barrel adjacent the gutters with the heating bands 134. The surface contaminant removal is thus accomplished similarly to the surface removal operation in the foreline 93 described above.

As indicated above, motive fluid condensate will normally be found present in very high concentrations in the lower portion of each gutter, particularly the gutters 150, 160 and 170, and their presence is in part the reason for additional valves 157, 167 and 177 which may be provided in the surface draw off lines 151, 161 and 171. After removal of fluid containing light end contaminants from the surface portion of the gutter 140, the drain line 146 may be opened to drain the lower portion of the gutter 140 into the collection vessel 152 (or admitted to the next lower gutter 150 as discussed above, for further enrichment processing). This would be accomplished by opening only the line 153 to lower the pressure within the vessel 152 below that adjacent the gutter 140, then opening the line 151 with the valve 157 closed, and opening the line 146. When the fluid is collected in the vessel 152, the vessel could then be drained through the line 154 for analysis by closing the lines 151 and 153, opening the bleed line 155 and then opening the line 154. If this condensate comprises nearly pure motive fluid, it can be re-admitted to the barrel and the boiler via the line 187. Condensates from the lower portions of the gutters 150 and 160 can be drained similarly. The gutter drain line 176 for the gutter 170 is of course provided with its own collection vessel 182. During periods when the gutters are not being drawn from, the various condensates overflow successive gutters in a waterfall effect.

Since the pressure gradient within the diffusion pump barrel 91 is from lowest at the top to highest at the bottom, opposite that of the foreline 93, the lightest of the heavy light end substances would be expected to be found in the gutter 170, with the heaviest found in the gutters 140 and 150. However, due to the high concentration of motive fluid condensate in the lower gutters, it may be found advantageous to use only the uppermost gutter 140 for the collection of heavy light end substances. In fact, the lower three gutters, particularly the gutters 160 and 170, would also contain very small concentrations of the lightest of the heavy end contaminants in the fluid spectrum, which may escape the boiler skimming process. Heavy end substances of molecular weight and volatility very close to that of the basic motive fluid will be carried along with the motive fluid through the chimney and nozzle assembly 90 into the diffusion pump barrel and will condense on the walls of the barrel 91 even more readily than the motive fluid itself. Small concentrations of these substances may be found in fluid drained from the bottom of the gutters 160 and 170. If fluid collected in the vessels 172 and 182 is found to be rich enough in the light heavy end contaminants, these gutters may be drained periodically as part of a programmed pump barrel purification procedure.

The automatic operation of the diffusion pump barrel purification and separation apparatus described above may be programmed according to results of initial analysis. Variations in the type of pump fluid used, in the exact specifications of the pump boiler and foreline, and in the conditions within the vacuum chamber will dictate drastically different results in the collection gutters 140–170. After such analysis, the opening of the fluid withdrawal lines can be sequenced and duration timed in order to provide maximum withdrawal of heavy light end and light heavy end contaminants with minimum withdrawal of basic motive fluid. Of course, as with the operation of the foreline purification modifications, all fluid withdrawn into the collection vessels 142–182 will contain a large amount of the motive fluid, but the system is designed to remove high concentrations of these contaminants as has never before been possible, so that pump performance can be increased and ultimate attainable chamber vacuum can be additionally lowered by one or more decades.

As indicated above, the diffusion pump assembly 85 including boiler, foreline and barrel modificatons can be used as a "slave" pump to a group of additional diffusion pumps serving the same vacuum system. Each of the additional "master" pumps would have boiler and foreline modifications only. The "slave-master" relationship between the pumps would simply be one of boiler fluid exchange. For example, the slave pump shown in FIG. 5 would dispense portions of its highly purified pump fluid from its boiler drain line 89 into the boilers of each of the master pumps. Such fluid would be admitted to each master pump through an auxiliary fluid adding line such as the line 187 shown in FIG. 5. In turn, fluid from the boilers of the master pumps, very pure but not to the extent of the fluid in the fully modified slave pump 85, would be taken from the boiler drain lines of each of the master pumps and delivered through the auxiliary fluid add line 187 into the slave pump 85 of FIG. 5. Such circulation between the pumps could be accomplished slowly and continuously, but would preferably be done periodically, with the slave pump 85 exchanging fluid with only one other pump at a time.

The fluid purification and separation apparatus of the above-described diffusion pump, including boiler, foreline and barrel modifications, can also be applied, in total or in part, purely as means of fluid separation in other disciplines apart from diffusion pumps and high vacuum production. For example, the surface heavy end skimming modifications of the invention can be employed in a fractionating column for the refining of petroleum. Surface skimming such as that described herein can be employed at all evaporative surfaces in the refining process--in the boiler and at each distillation plate in the fractionating column (not shown in the drawings). The employment of such skimming modifications to refining equipment will very significantly increase throughput in the refining process by removal of heavy end fractions at all surfaces, thereby greatly reducing torpidity and providing for continuous nearly 100% working evaporative surfaces. In addition, petroleum fractions withdrawn and collected through the skimming operations would comprise certain of the fractions desired to be recovered. The fractions recovered in this way would of course vary from level to level in the column, with the heaviest heavy ends taken from the boiler and the lightest taken from the uppermost distillation plate. Efficiency, productivity and output of a refinery can thus be achieved at a minimum capital expenditure.

The extremely high purification and separation capability of the foreline and barrel modifications described above can be employed, in total or in part, for the separation of the isotypes of uranium. Raw feedstock uranium slurry would be heated in a boiler similar to the boiler 86 of the diffusion pump 85 shown in FIG. 5. In the foreline and barrel gutters, means would preferably be provided for increasing condensing area, such as baffles over the foreline gutters and stainless steel packing within the foreline and barrel gutters (not shown). As mentioned above, such baffles slow pump throughput but increase separation capabilities. Gutter packing also increases separation capabilities. The high vacuum and pressure gradient present in the diffusion pump barrel can be utilized to aid in the separation/enrichment of the isotopes of uranium.

Separation of metals from one another and from impurities can also be effected using the purification and separation apparatus described hereinabove, in total or in part. The methods and apparatus of the invention are particularly adaptable for the separation of metals in the low and intermediate melting point range, such as those metals melting below about 2500° F.

Various other embodiments and alterations to these preferred embodiments will be apparent to those skilled in the art and may be made without departing from the spirit and scope of the following claims.

I claim:

1. In a method for separating fractions of a liquid which method includes the steps of heating a body of the liquid to a temperature sufficiently high that the liquid has a vapor pressure at least substantially as high as the pressure to which the body of the liquid is subjected, condensing various fractions of the liquid at various levels above the surface of the heated body of liquid, and collecting various liquid fractions at their respective condensation levels, the improvement of withdrawing liquid at more than one level from at least one liquid fraction collected at its respective condensation level and supplying heat to said various liquid fractions to effect circulation and revaporization of said various liquid fractions.

2. The method of claim 1 which further includes withdrawing from the heated body of liquid at least a portion of the upper surface.

3. In a method for separating fractions of a liquid, which method includes the steps of heating a body of the liquid to a temperature sufficiently high that the liquid has a vapor pressure at least substantially as high as the pressure to which the body of the liquid is subjected, condensing various fractions of the liquid at various levels above the surface of the heated body of liquid, and collecting various liquid fractions at their respective condensation levels, the improvement comprising supplying heat to said various liquid fractions and separately withdrawing portions of at least one collected liquid fraction from at least two vertically discrete levels of such collected liquid fraction.

4. In a method for separating fractions of a liquid, which method includes the steps of heating a body of the liquid to a temperature sufficiently high that the liquid has a vapor pressure at least substantially as high as the pressure to which the body of the liquid is subjected thereby vaporizing the surface of said liquid and condensing various fractions of the liquid at various levels above the surface of the heated body of liquid to provide a volume of a collected liquid fraction at each of said various levels, the improvement of separately withdrawing from at least one collected liquid fraction volume a first upper portion from the surface of said volume and a second portion from the remainder of said volume, said first portion characterized by the increased presence of liquid fractions of higher molecular weights than said second portion.

5. In a method for separating fractions of a liquid, which method includes the steps of heating a body of the liquid to a temperature sufficiently high that the liquid has a vapor pressure at least substantially as high as the pressure to which the body of the liquid is subjected thereby vaporizing the surface of said liquid and condensing various fractions of the liquid at various levels above the surface of the heated body of liquid to provide a volume of a collected liquid fraction at each of said various levels, the improvement of separately withdrawing from each collected liquid fraction volume a first upper portion from the surface of said volume and a second portion from the remainder of said volume and discharging such separately withdrawn portions to collection vessels, said first portion characterized by the increased presence of liquid fractions of higher molecular weights than said second portion.

* * * * *